(12) United States Patent
Haselton

(10) Patent No.: US 11,786,836 B2
(45) Date of Patent: Oct. 17, 2023

(54) ROTATING TUNNEL OPTICAL ILLUSION

(71) Applicant: Bennett Haselton, Bellevue, WA (US)

(72) Inventor: Bennett Haselton, Bellevue, WA (US)

(*) Notice: Subject to any disclaimer, the term of this patent is extended or adjusted under 35 U.S.C. 154(b) by 141 days.

(21) Appl. No.: 17/563,657

(22) Filed: Dec. 28, 2021

(65) Prior Publication Data
US 2022/0203257 A1    Jun. 30, 2022

Related U.S. Application Data

(60) Provisional application No. 63/131,230, filed on Dec. 28, 2020.

(51) Int. Cl.
*A63H 33/22* (2006.01)
*G02B 27/06* (2006.01)

(52) U.S. Cl.
CPC ............. *A63H 33/22* (2013.01); *G02B 27/06* (2013.01)

(58) Field of Classification Search
CPC ........ A63H 33/22; G03B 25/00; G03B 21/00; G03B 39/02; G02B 27/06
See application file for complete search history.

(56) References Cited

U.S. PATENT DOCUMENTS

| 64,117 | A | * | 4/1867 | Lincoln | .................. | G03B 21/32 |
| | | | | | | 352/101 |
| 4,426,021 | A | * | 1/1984 | Rosenthal | ................ | B67D 1/08 |
| | | | | | | 40/442 |
| 5,870,170 | A | * | 2/1999 | Pope | ........................ | G09F 19/12 |
| | | | | | | 352/101 |
| 9,170,479 | B1 | * | 10/2015 | Kosakura | ............... | G03B 25/00 |
| 9,488,903 | B1 | * | 11/2016 | Veras de Souza | ..... | G03B 25/00 |

* cited by examiner

*Primary Examiner* — Leon W Rhodes, Jr.
(74) *Attorney, Agent, or Firm* — Seattle Patent Group; James Haugen

(57) ABSTRACT

A 3-dimensional object may contain tunnels passing through the object so that when the object rotates, if the object is viewed from a certain angle, the tunnel is only visible for the moment that the tunnel is pointed directly at the viewer's eye. This system of tunnels can be used to create an animated system of dots when the shape rotates, and the dots can be positioned so that they create the animated illusion of dots moving along the surface of the shape in the opposite of the true direction of rotation.

3 Claims, 4 Drawing Sheets

Side view

ROTATING TUNNEL OPTICAL ILLUSION

FIELD

This invention relates generally to a rotating 3D optical illusion.

BACKGROUND

Optical illusions are commonly used for purposes of entertainment or to educate about the ambiguities of visual perception. One popular optical illusion, rendered in 2-dimensional animation, is the "rotating dancer" illusion, which depicts the silhouette of a rotating dancer viewed from the side; the viewer's perception switches between viewing the dancer as either rotating clockwise or counter-clockwise, since either movement would be compatible with the silhouette as seen by the viewer. However, when viewing a real rotating object in 3 dimensions, a viewer's depth perception normally leads them to perceive the correct direction of motion, preventing the "illusion" from occurring.

In a different optical illusion, a series of static images, each slightly different from the previous one, if viewed in rapid succession can cause the appearance of a single object in motion—responsible for the perception of motion in films and animated cartoons. In the simplest case, if a series of images each depict a single dot, with each image showing the dot in a slightly different position from the previous image, then the images viewed in rapid succession will create the illusion of the motion of a single dot.

SUMMARY

The following presents a simplified summary of the disclosure to provide a basic understanding to the reader.

The instant application discloses a design for a 3-dimensional shape which, when viewed from a certain angle and rotated clockwise, will create the illusion that it is rotating counter-clockwise (or vice versa).

The illusion is created with the aid of tunnels which pass through the 3-dimensional shape at a constant angle with the ground (for simplicity let us assume the tunnels form a 10-degree angle with the horizontal plane). If the viewer's eye is positioned so that they are looking at the shape from above at a 10-degree angle, then as the shape rotates, each tunnel will be visible only for the moment that the tunnel is pointed directly at the viewer's eye. If one imagines the time period which comprises one full 360-degree rotation of the object, then tunnels can be positioned arbitrarily within the shape so that a dot can appear at any moment in that time period, at any desired position.

Using this technique, one can position a system of tunnels precisely so that as the shape rotates clockwise (the side facing the viewer is moving from right to left), a series of dots appears to the viewer, one after the other, with each dot appearing slightly to the right of the previous dot. Using several systems of tunnels, each creating the illusion of a dot moving left to right, one can create the illusion that the side of the shape facing the viewer is moving left to right, i.e. that the shape is rotating counter-clockwise, the opposite of the true direction of rotation.

DETAILED DESCRIPTION

Figure 1:
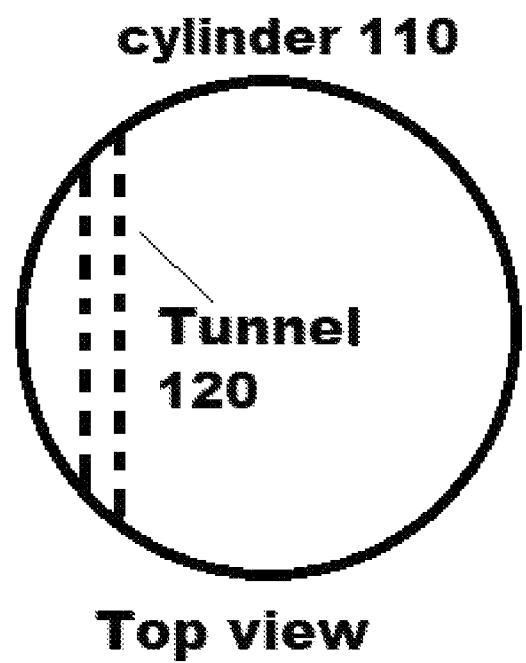
FIG. 1 illustrates the geometry of a single tunnel passing through a cylinder, forming a 10-degree angle with the horizontal plane, seen from a top view.

FIG. 1 shows a top view of a cylinder 110 with a single tunnel 120 passing through the cylinder at a 10-degree angle with the ground.

Figure 2:
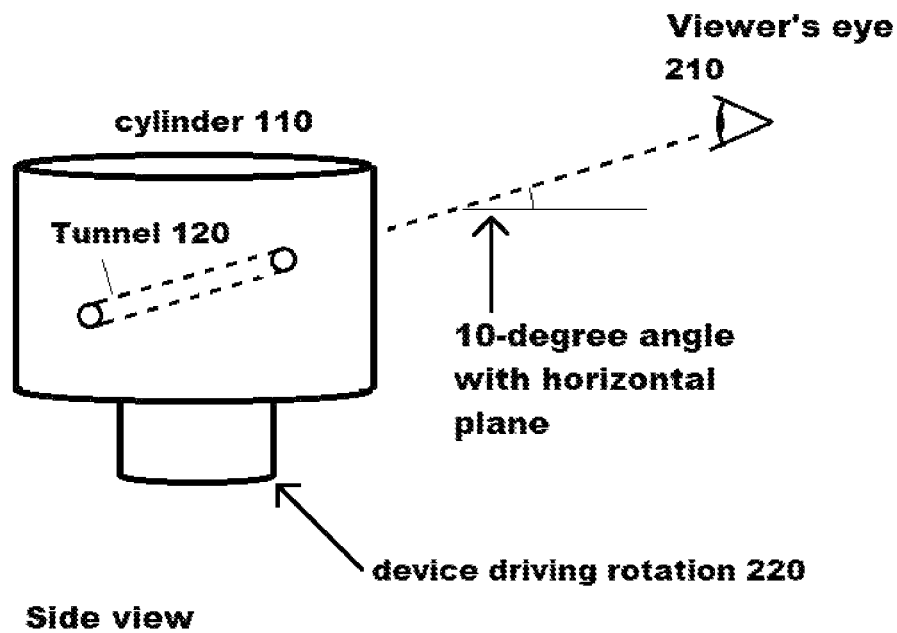
FIG. 2 illustrates the same shape as FIG. 1 seen from a side view.

FIG. 2 shows the same cylinder 110 from a side view. If a viewer is viewing the cylinder 110 from above at an angle of 10 degrees, one can imagine that as the cylinder 110 rotates through a full rotation cycle, the tunnel is only visible for the single moment that the tunnel is pointed directly at the viewer's eye 210. The cylinder is shown connected to a device 220 driving the rotation of the cylinder.

Figure 3:
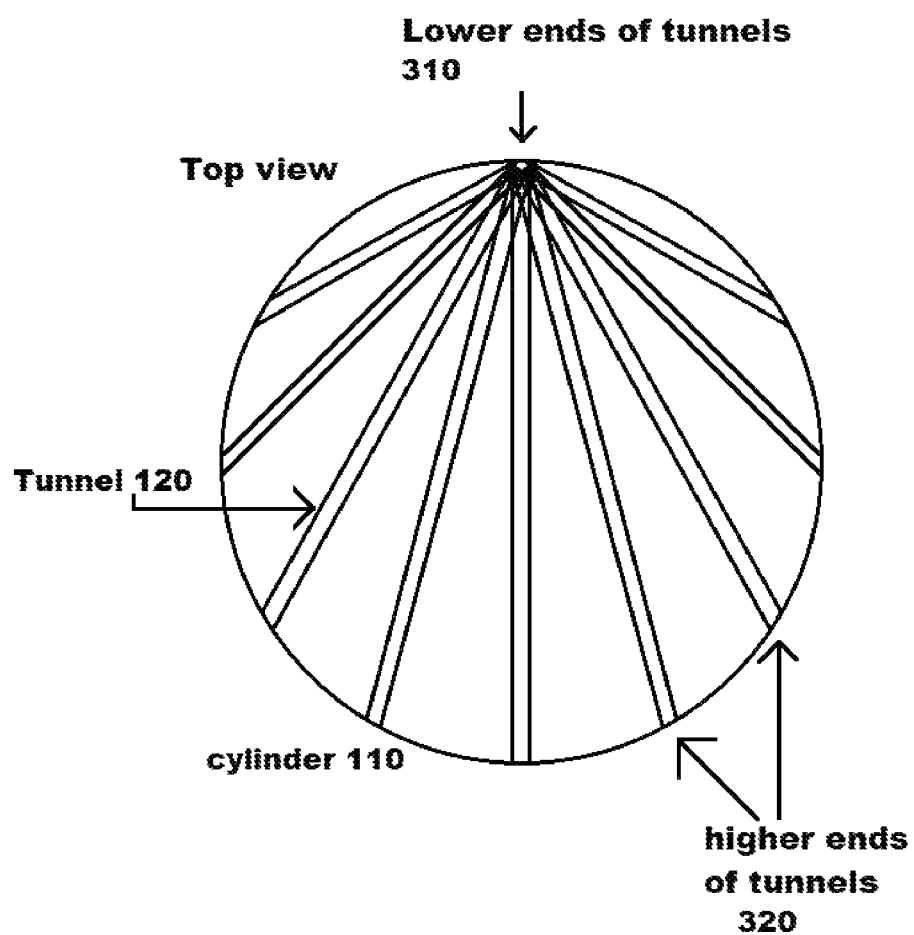
FIG. 3 illustrates the geometry of a system of tunnels positioned to create the illusion of a single dot moving in the opposite of the true direction of rotation.

FIG. 3 shows the top view of a system of tunnels passing through the cylinder 110, positioned so that as the cylinder 110 rotates clockwise, if the cylinder 110 is viewed from above at a 10-degree angle, the tunnels 120 create the illusion of a single dot moving in the opposite of the true direction of rotation. The point at which the tunnels converge is at the lower ends of the tunnels 310; the divergent ends of the tunnel are the higher ends of the tunnels 320. If one imagines the circular shape rotating clockwise, and imagines the point of view of a viewer who can only see each tunnel 120 when the "upper" end of the tunnel is pointed directly toward the viewer's eye, then even though the bottom edge of the shape is moving from right to left, the tunnels will create in the viewer's perception a series of dots with each one appearing to the right of the previous one, such that together they create the animated illusion of a single dot moving from left to right. As this shape rotates, during the period of rotation when all of the "higher" ends of the tunnels are on the opposite side of the shape from the viewer's eye, no dots will be visible to the viewer.

Figure 4:
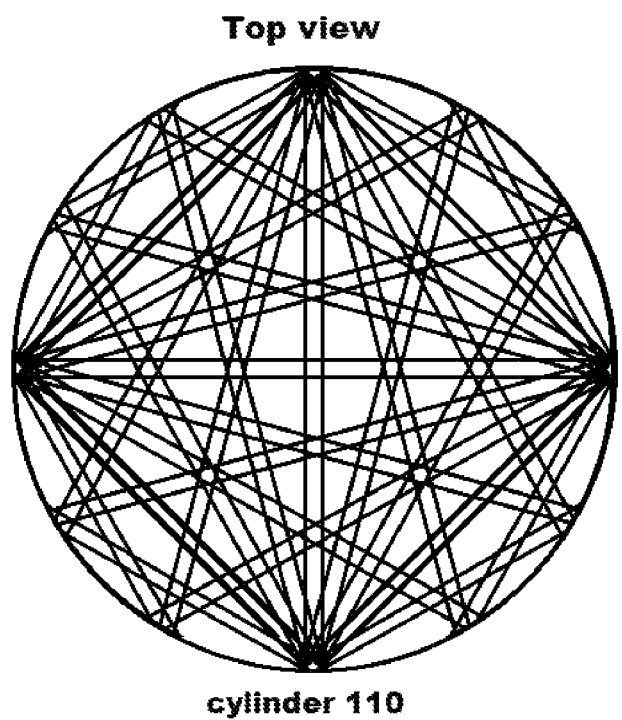
FIG. 4 illustrates the geometry of multiple systems of tunnels (repeated instances of the system depicted in FIG. 3), positioned to create the illusion of multiple dots moving in the opposite of the true direction of rotation.

FIG. 4 depicts the geometry of a cylinder 110 containing multiple systems of tunnels, where each system of tunnels is identical to the system shown in FIG. 3, translated and rotated within the geometry of the shape. This ensures that, unlike the shape depicted in FIG. 3, as this shape rotates there are always multiple dots visible to the viewer's eye, each appearing to move in the opposite from the true direction of movement of the side of the shape facing the viewer. By ensuring that multiple dots are always visibly moving, this enhances the illusion of continuous rotation of the shape in the opposite of the direction of true rotation.

What is claimed is:
1. A system comprising:
    a solid 3-dimensional shape, containing a plurality of tunnels through which light can pass such that each of the plurality of tunnels is only visible as a dot when the shape is oriented so that that tunnel is pointed directly at the viewer's eye, and such that the dots visible at different times create an animated optical illusion as the shape rotates; and
    a device, causing the shape to rotate at a constant speed.
2. The system of claim 1 wherein the device creating rotating motion is physically part of the 3-dimensional shape.

3. The system of claim 1 wherein the device creating rotating motion is physically separate from the 3-dimensional shape but attached in a way to drive the rotating motion.

\* \* \* \* \*